United States Patent [19]
Rabideau

[11] Patent Number: 5,904,001
[45] Date of Patent: May 18, 1999

[54] SPINDLE BAYONET FISH HOOK APPARATUS AND METHOD

[75] Inventor: Phillip A. Rabideau, Austin, Tex.

[73] Assignee: Mister Twister, L.L.C., Minden, La.

[21] Appl. No.: 08/949,644

[22] Filed: Oct. 14, 1997

Related U.S. Application Data

[63] Continuation of application No. 08/580,932, Dec. 29, 1995, abandoned.

[51] Int. Cl.$^6$ .................................................. A01K 83/06
[52] U.S. Cl. ............................................. 43/44.8; 43/44.2
[58] Field of Search ............................... 43/44.2, 44.81, 43/44.8, 42.28, 42.29; D22/61

[56] References Cited

U.S. PATENT DOCUMENTS

| | | | |
|---|---|---|---|
| D. 341,325 | 11/1993 | Beats | D10/61 |
| 3,624,950 | 12/1971 | Merckes | 43/44.2 |
| 3,724,116 | 4/1973 | Lindner | 43/44.8 |
| 4,334,381 | 6/1982 | Carver | 43/44.8 |
| 4,367,607 | 1/1983 | Hedman | 43/44.8 |
| 5,220,743 | 6/1993 | McClellan | 43/44.81 |
| 5,230,178 | 7/1993 | Dillard | 43/44.8 |
| 5,303,497 | 4/1994 | Rabideau | 43/42.28 |
| 5,386,661 | 2/1995 | Davis | 43/44.2 |

*Primary Examiner*—Kurt Rowan
*Attorney, Agent, or Firm*—J. Nevin Shaffer, Jr.; Shaffer & Culbertson, LLP

[57] ABSTRACT

A spindle bayonet fish hook apparatus and method includes lure engaging body (12) with two ends (14) and (16). End (14) is larger in circumference than end (16 and lure engaging body (12) is symmetrical along a longitudinal axis (18). Lure engaging body (12) includes a connection (20) for connecting to fish equipment, such as a fish hook (24) and the like. Artificial plastic worm (22) is attached to lure engaging body (12) by pressing the head (32) of artificial plastic worm (22) over end (16) and up to end (14) in one embodiment. Because of the spindle shape of lure engaging body (12), concentric adhesion forces result from the radially stretching and expansion of the artificial plastic worm (22) by the insertion of lure engaging body (12) within it. As a result, artificial plastic worm (22) increasingly resists removal from lure engaging body (12) in response to retrieval of casts and the like. However, when faced with sufficient force, artificial plastic worm (22) pops off lure engaging body (12), such in the instance as when fish hook (24) is set. Because lure engaging body (12) does not include hooks, screws, barbs and the like, artificial plastic worm (22) may be reused over and over since little or no gouging and degradation of the plastic of the worm occurs. In a preferred embodiment, head (32) of artificial plastic worm (22) is pressed beyond end (14) and into space (21) between connection (20) and eye (30) of fish hook (24). This allows the head (32) of artificial plastic worm (22) to collapse into space (21), further increasing the resistance to removal. In another embodiment, the outer surface of lure engaging body (12) is coarse or corrugated, not sharp or smooth, so that the concentric adhesion forces are amplified between lure engaging body (12) and artificial plastic worm (22).

8 Claims, 1 Drawing Sheet

SPINDLE BAYONET FISH HOOK APPARATUS AND METHOD

This application is a continuation of application Ser. No. 08/580,932, filed Dec. 29, 1995, now abandoned.

BACKGROUND OF THE INVENTION

This invention relates to a novel spindle bayonet fish hook apparatus and method for retaining and releasing artificial baits from a hook.

As the art and science of catching fish has evolved, so has the use of artificial baits, such as rubber or plastic worms, in place of live bait. The hook of this invention can approximately be referred to as a "worm hook," of which there are several types. These hooks are used in conjunction with an impaled plastic worm, grub or other trailers in order to fish these attachments in a "weedless" mode. For convenience the artificial bait on the hook will henceforth be referred to as a "worm."

With worm hooks, the worm is restrained at the anterior eye end of the hook by various mechanisms, and the body of the worm is impaled over the hook point to guard it. While threading the worm onto the hook, an attempt is made to keep the worm in alignment with the eye of the hook and its point. This allows the hook and worm combination to track through the water in the preferred straight line.

There are two general types of worm hooks. In the first category, the hook could be referred to as the shank-mounted variety. Here the anterior portion of the worm is threaded onto the anterior end of the hook shank, near the eye of the hook, and restrained by an interference means. The interference means generally take the form of a right angle offset in the shank or several barbs on the hook shank.

The second type of worm hook can conveniently be referred to as a bayonet-type hook. Here a bayonet is affixed to the hook eye. On the bayonet there is an interference means to restrain the worm. There is one popular bayonet-type hook described in U.S. Pat. No. 4,334,381 which uses barbs on a wire bayonet to secure the worm on the bayonet. A dual wire bayonet with bent wire barbs are used on the Mustad "NEEDLE POWERLOCK" brand worm hook bayonet, and a wire bayonet in a screw mode is utilized on the OLDHAM "SCREW LOCK" brand worm hook bayonet.

Upon detecting the fish swallowing the worm, the fisherman "sets" the hook, hopefully impaling the fish's mouth on the hook point, by a vigorous upward thrust of the fishing rod. This brisk motion drives the hook point into the fish, but first the hook must have enough relative thrust to move the hook point through the worm. In other words, the worm, restrained by the fish's mouth and inertia, must remain relatively stationary to the hook point at the instant it is set for an optimum set, because the hook point must first be pulled through the worm before it can impale the fish. This is difficult to achieve if the worm is affixed firmly to the anterior of the hook, either with a shank-mounted or bayonet-type hook, because the worm moves with the hook during the setting motion. An ideal worm hook, therefore, restrains the worm during retrieval through brush and weeds, but releases the worm from the anterior of the hook upon hook set.

Another condition that exists when setting a worm hook is "balling." During hook set, on shank-mounted hooks, the anterior section of the worm travels down the hook shank creating a loop or ball near the bend and point of the hook. The worm, in this ball-like condition on the worm hook, impedes the effective hooking of the fish.

Prior art bayonet devices use barbs, screws or bent hooks to retain the worm on the bayonet. As a result, during the hook set, the worm is degraded on every hook set. That is, pieces or particles of the anterior part of the worm are removed during each hook set and eventually, and sooner than later, the worm must be replaced.

As a result, there is a need in the art for a device that (1) holds a worm easily in alignment on a hook as the worm travels through brush and weeds; (2) releases the worm on hook set, so the hook point can move easily through the worm; (3) on hook set the worm dangles at one point only on the hook shaft and thereby avoids balling; and (4) minimizes degradation of the worm during repeated sets.

SHORT STATEMENT OF THE INVENTION

Accordingly, a spindle bayonet fish hook apparatus and method of the present invention includes a lure engaging body with two ends symmetrical about a longitudinal axis. A connection is provided at the first end for connection of the lure engaging body to fishing equipment. The first end of the lure engaging body, at the connection, has one diameter and the lure engaging body has a decreasing diameter from the first end to the second end. In a preferred embodiment, the lure engaging body is spindle shaped and comes to a point at the second end. Also, in one embodiment, the lure engaging body has a coarse and/or corrugated surface and the connector is connected to the eye of a fish hook. In another preferred embodiment, the lure engaging body is spaced apart from the connector. In use, an artificial worm utilized with the invention is attached head first to the lure engaging body with the end of the artificial worm being pressed over the second pointed end and up to the larger diameter first end. In another embodiment, the artificial worm is pushed past the larger diameter first end and into the space between the lure engaging body and the connector. In general, when the artificial worm is pressed onto the lure engaging body, the worm stretches radially to accommodate the lure engaging body. The shape of the lure engaging body is so designed so the artificial worm will not rupture while creating compressive force on the lure engaging body. In so doing, the artificial worm resists the intrusion and the worm "compresses" the lure engaging body and is restrained thereon without screws, hooks, needles, barbs or the like. That is, this compression provides significant radial, compressive, and adhesion forces that secures the worm to the lure engagement body without the typical prior art barbs, screws or hooks. Additionally, the artificial worm reacts to the forces attempting to pull it off the lure engaging body. During retrieval of a cast, for example, a vacuum is created at the interfering surfaces, that reinforces the adhering forces. During hook set, however, the worm attempts to stay in place due to its own inertia and contact with the inside of the fish's mouth. The worm is constrained on the lure engaging body by the radial and adhesive forces plus the vacuum effect, but at an appropriate point, the composite forces are overcome and the worm literally pops off with a clean release. Because no interference objects are utilized to restrain the worm on the lure engaging body, no particles of plastic are removed during the set, and the worm can be reused many times. Also, because of the configuration of the lure engaging body there is no balling effect during hook set. In short, the inventor has found that this spindle bayonet, worm hook configuration provides the necessary features for optimum hook setting and meeting all of the objectives set forth above.

BRIEF DESCRIPTION OF THE DRAWINGS

Other objects, advantages, and features of the present invention will become more fully apparent from the following detailed description of the preferred embodiment, the appended claims and the accompanying drawings in which:

DETAILED DESCRIPTION OF THE PREFERRED EMBODIMENT

Figure 3:
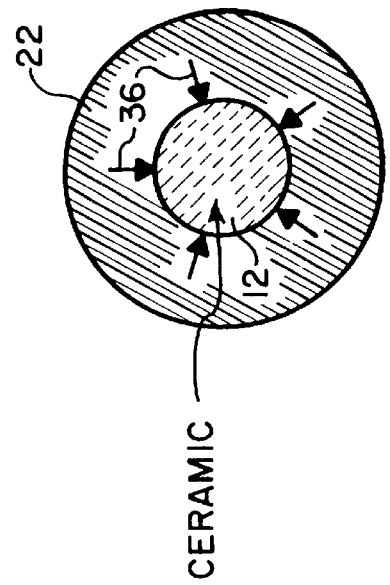
FIG. 3 is a cross sectional end view taken along lines 3—3 in FIG. 1.
Figure 1:
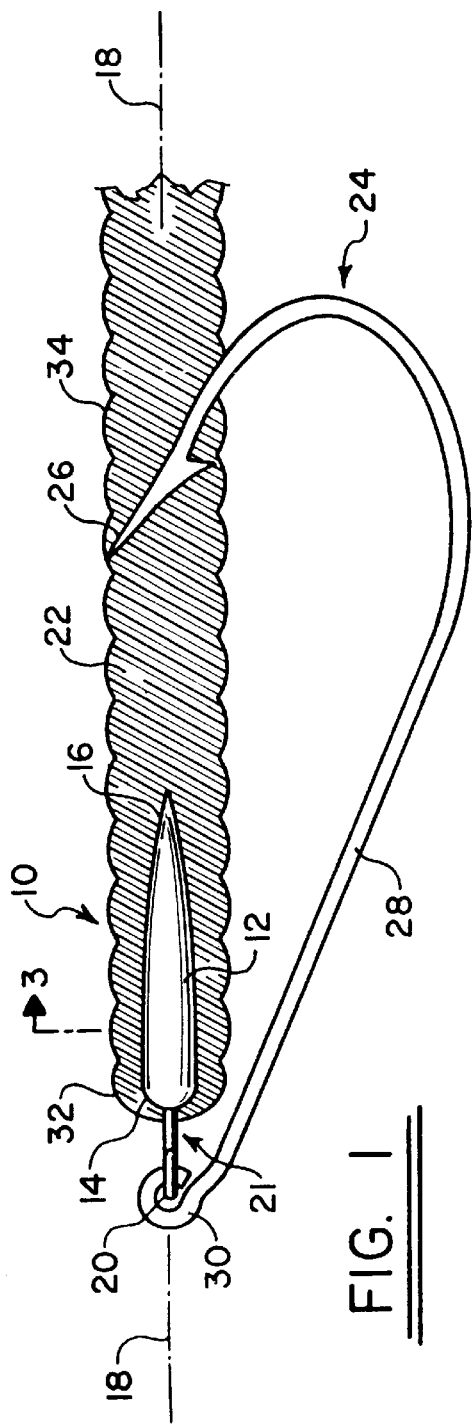
FIG. 1 is a side view of a preferred embodiment of the present invention with the artificial worm partially shown and cut away to illustrate the invention.
Figure 2:
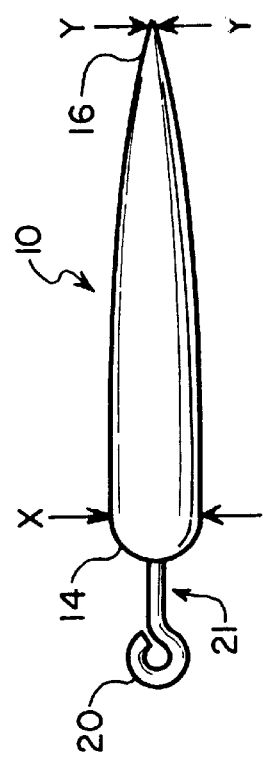
FIG. 2 is a side view of the lure engaging body of the present invention.

The preferred embodiment of the present invention is illustrated by way of example in FIGS. 1–3. With specific reference to FIGS. 1 and 2, a spindle bayonet fish hook 10 includes lure engaging body 12 with two ends 14 and 16, symmetrical about longitudinal axis 18. Further, connection 20 at end 14 is also illustrated. Also shown is a partial cross sectional view of artificial plastic worm 22 and fish hook 24. Fish hook 24 includes hookpoint 26, fish hook shaft 28, and eye 30. As shown in FIG. 1, artificial plastic worm 22 has had the head 32 of artificial plastic worm 22 pressed onto end 16 and up to end 14 of lure engaging body 12. Subsequently, hookpoint 26 has been impaled in trailing portion 34 of artificial plastic worm 22.

Referring now to FIG. 3, the cross section of lure engaging body 12, after it has been pressed into artificial plastic worm 22, is illustrated. It can be seen that lure engaging body 12, having been pressed into artificial plastic worm 22, results in concentric cohesion forces illustrated by arrows 36. The inventor has determined that, unlike prior art bayonets with screws, hooks, barbs, or other interferences, the resistance to removal of the artificial plastic worm 22 from lure engaging body 12 initially increases as the pressure to remove it increases, much like a "Chinese" finger puzzle. That is, the inventor has come to understand that the artificial plastic worm 22 stretches radially to accommodate lure engaging body 12 as lure engaging body 12 is inserted into the head 32 of artificial plastic worm 22. In so doing, radial force, illustrated by arrows 36, is applied concentrically and circumferencially around lure engaging body 12. As a result, artificial plastic worm 22 is retained on lure engaging body 12 without the need for prior art screws, hooks, barbs and the like. Further, the inventor has discovered that, after artificial plastic worm 22 is attached to the lure engaging body 12, it resists being pulled off because a vacuum is created at the interfering surfaces, i.e. the lure engaging body 12 and the interior of artificial plastic worm 22 where the surface of lure engaging body 12 engages artificial plastic worm 22. However, advantageously, when enough pulling force is encountered, i.e. when setting the hook, the restraining forces are suddenly overcome and the artificial plastic worm 22 simply "pops off" the lure engaging body 12 with a clean release. In contrast, prior art screws, hooks, and barbs essentially continuously release the artificial plastic worm 22 even against the simple pressure of retrieving a cast.

Further, prior art devices, utilizing screws, hooks, needles, barbs and the like remove bits of plastic worm 22 every time they are utilized. As a result, the artificial plastic worm 22 is seriously degraded by prior art devices with each use. To the contrary, the inventor has determined that the contoured shape of lure engaging body 12, wherein end 14 is greater in circumference diameter, diameter "X" around longitudinal axis 18 than end 16, diameter "y" does not continuously degrade the artificial plastic worm 22. The preferred embodiment for lure engaging body 12 is a spindle shape, as illustrated. Further, one preferred embodiment includes a coarse outer surface of lure engaging body 12. This coarse surface is not rough, nor is it smooth, but simply coarse, such as an unfinished ceramic surface, so as to amplify the forces of adhesion already present.

A further enhancement and an additional embodiment of the present invention is the positioning of the artificial plastic worm 22 beyond end 14 and into space 21 between connector 20 and eye 30 of hook 24. The inventor has found that this position allows the head 32 of artificial plastic worm 22 to partially close together in space 21. As a result, the artificial plastic worm 22 is even more securely engaged with lure engaging body 12 around the larger circumference of end 14.

In use, a fisherman takes artificial plastic worm 22 and presses the head 32 over end 16 and along lure engaging body 12 up to, or over, end 14. Lure engaging body 12 is connected by means of connection 20 to eye 30 of hook 24. Connection 20 may be a bent metal hook as illustrated in FIG. 2 or any other means known in the art for connecting lure engaging body 12 either directly to eye 30 or directly to any other fishing equipment that may be desired. Once head 32 of artificial plastic worm 22 is in place, hookpoint 26 is introduced into trailing portion 24, as is known in the art. At this point, lure engaging body 12 has radially stretched and expanded the fish lure consisting of artificial plastic worm 22. Resultantly, concentric adhesion forces shown by arrows 36 in FIG. 3 resist the removal of artificial plastic worm 22 from lure engaging body 12. In fact, the resistance to removal generally increases until such time as overwhelming forces are applied to the worm, such as occurs when setting the hookpoint 26, and the head 32 of artificial plastic worm 22 pops off lure engaging body 12. After removing the fish and retrieving fish hook 24, the head 32 of artificial plastic worm 22 is replaced over end 16 over lure engaging body 12 up to end 14 and/or into space 21 for reuse. Because lure engaging body 12 utilizes the stretching of artificial plastic worm 22 and resultant compressive forces to hold lure engaging body 12 within artificial plastic worm 22 without use of screws, hooks, barbs or the like, little or no degradation of artificial plastic worm 22 occurs. That is, there is little or no gouging of the artificial plastic worm 22 and/or removal of bits and pieces or artificial plastic worm 22, as is common with screws, hooks, barbs and the like. As a result, artificial plastic worm 22 may be utilized again and again by means of this invention.

While the present invention has been disclosed in connection with the preferred embodiment thereof, it should be understood that there may be other embodiments which fall within the spirit and scope of the invention as defined by the following claims.

I claim:

1. A spindle bayonet fish hook apparatus for the controlled release of artificial radially expandable fishing lures consisting of:

(a) a lure engaging body with a continuous, uninterrupted, projection free surface for expanding the artificial radially expandable fishing lure when inserted therein with a first and a second end symmetrical about a longitudinal axis wherein the lure engaging body comprises a spindle shape coming to a point at the second end;

(b) a connection means at the first end for connection of the lure engaging body to fishing equipment connected directly to an eye of a fish hook;

(c) the first end at the connection means having one diameter; and (d) the lure engaging body having a substantially continuously deceasing diameter from the first end to the second end so that said lure engaging body expands the artificial radially expandable fishing lure and creates compression force along the entire length of the lure engaging body and so that said lure engaging body is controllably released without further degrading the artificial radially expandable fishing lure when the compression force is overcome.

2. A spindle bayonet fish hook apparatus for the controlled release of artificial radially expandable fishing lures consisting of:

(a) a lure engaging body with a continuous, uninterrupted, projection free surface with two ends, one larger than the other, symmetrical about a longitudinal axis;

(b) a connector at the larger end connected to an eye of a fish hook; and (c) the lure engaging body having an unobstructed surface and decreasing in diameter along the majority of the length of its length until the other end forms a sharp point so that said lure engaging body expands the artificial radially expandable fishing lure and creates compression force along the entire length of the lure engaging body and so that said lure engaging body is controllably released without further degrading the artificial radially expandable fishing lure when the compression force is overcome.

3. The apparatus of claim 2, wherein the lure engaging body is spaced apart from the connector.

4. A method of radially stretching and expanding an artificial radially expandable fishing lure comprising the steps of:

(a) constructing a lure engaging body with a continuous, uninterrupted, projection free, surface;

(b) providing a connection means at a first end for connection of the lure engaging body to fishing equipment;

(c) making the first end one diameter;

(d) making the lure engaging body substantially continuous decrease in diameter from the first end to the second end; and (e) forcing a radially stretchable, expandable fishing lure onto the second end and up to the first end so that said lure engaging body expands the artificial radially expandable fishing lure and creates compression force along the entire length of the lure engaging body and so that said lure engaging body is controllably released without further degrading the artificial radially expandable fishing lure when the compression force is overcome.

5. The method of claim 4 further comprising the step of forming the lure engaging body into a spindle shape coming to a point at the second end.

6. The method of claim 5 further comprising the step of connecting the connecting means directly to an eye of a fish hook.

7. The method of claim 4 further comprising the step of spacing the first end apart from the connection means.

8. The method of claim 7 further comprising the step of forcing the radially stretchable expandable fishing lure beyond the first end.

* * * * *